No. 705,420. Patented July 22, 1902.
R. MINGES & J. EWELL, Jr.
NUT LOCK.
(Application filed Nov. 2, 1901.)

(No Model.)

WITNESSES:
L. G. Hande
A. M. Meynes

INVENTORS.
RICHARD MINGES
JOHN EWELL Jr.
BY Mason Fenwick Lawrence
their ATTORNEYS

UNITED STATES PATENT OFFICE.

RICHARD MINGES AND JOHN EWELL, JR., OF DENVER, COLORADO.

NUT-LOCK.

SPECIFICATION forming part of Letters Patent No. 705,420, dated July 22, 1902.

Application filed November 2, 1901. Serial No. 80,943. (No model.)

*To all whom it may concern:*

Be it known that we, RICHARD MINGES and JOHN EWELL, Jr., citizens of the United States, residing at Denver, in the county of Arapahoe and State of Colorado, have invented certain new and useful Improvements in Nut-Locks; and we do hereby declare the following to be a full, clear, and exact description of the invention, such as will enable others skilled in the art to which it appertains to make and use the same.

Our invention relates to improvements in nut-locks; and it consists in a nut-lock comprising a yielding pawl or locking-piece mounted in a recess or socket formed in the nut to be locked and adapted to bear against notches or ratchet-teeth formed upon threads of the bolt, the said pawl being capable of bending without breaking when the nut is forcibly unscrewed, the said recess having a socket or enlargement to accommodate the end of the pawl in its position when folded back.

It also consists in certain other novel constructions, combinations, and arrangements of parts, as will be hereinafter fully described and claimed.

Figure 1:
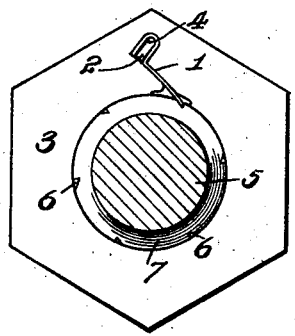
Figure 2:
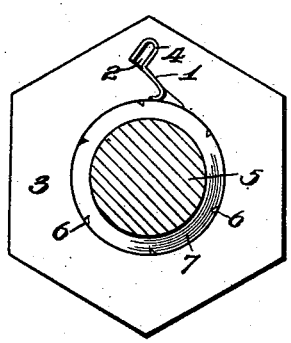
Figure 3:
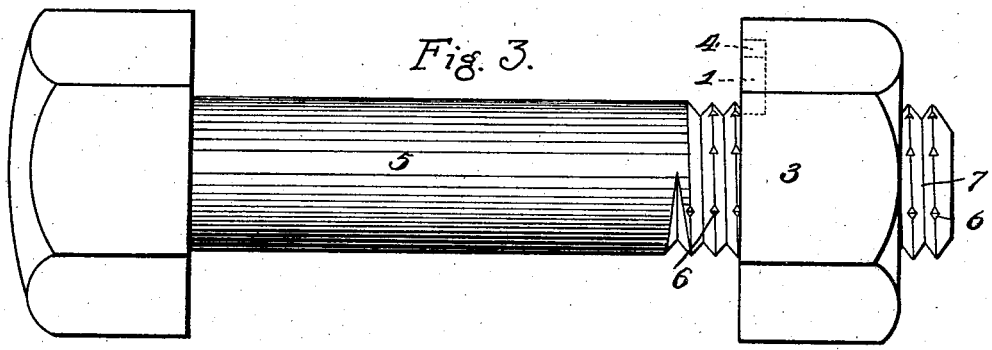
Figure 4:
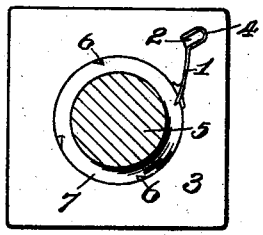
Figure 5:
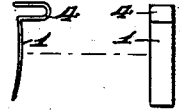
Figure 6:
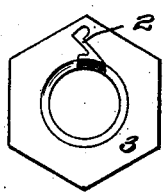

In the accompanying drawings, Figure 1 is a plan view of the inner surface of a nut, the bolt upon which it is screwed being shown in cross-section and the nut-lock being shown in position engaging the notches in the thread of the bolt. Fig. 2 is a similar view, but showing the thread-engaging end of the nut-lock bent back as when the nut is being forcibly reversed upon the threads of the bolt. Fig. 3 is a side elevation of a bolt and nut, the lock being shown in dotted lines. Fig. 4 is a view similar to Fig. 1, but showing a square nut instead of a hexagonal one. Fig. 5 is a detail view of the lock. Fig. 6 is a detail view of the nut, showing the recess formed therein for the reception of the lock.

The present invention is designed to produce a nut-lock which will positively hold a nut from working loose upon the threads of a bolt under the action of all ordinary jarring, but will permit of the nut being forcefully turned in a reverse direction by the use of a suitable tool or wrench, the lock yielding in such instance and being bent backwardly at its point for permitting the removal of the nut.

The device constituting the present invention is exceedingly simple, being preferably made in the form of a flat piece of metal bent to one side and doubled upon itself at one end to form a retaining-head for holding it in position on the nut.

As illustrated in the drawings, the lock 1 engages a recess 2, formed in the nut 3. The recess 2 is formed with an enlargement at each end, the intermediate portion being just large enough to receive flat metal composing the lock. The outer end of the lock is doubled to form a head 4, the parallel portions of said head being sufficiently spaced apart to permit the head to yield sufficiently for the lock or pawl to have a chance to move longitudinally in the recess 2 when the said lock is being bent in either direction at its point. The inner end of the recess 2 is flared, so as to accommodate the nut-lock when in its locking position, as shown in Fig. 1, and also when in an unlocked position, as shown in Fig. 2. The bolt, as 5, which is engaged by the nut, is formed with a series of notches 6 upon its threads 7, which form ratchet-teeth for engaging the nut-lock 1.

The nut-lock is formed of thin metal having sufficient stiffness to spring into the notches 6 when the nut is being screwed into place, and thereby prevent a reverse movement of the said nut. When, however, it is desired to remove the nut, a wrench or other tool of considerable power is applied to the nut, and it is forced in a reverse direction for unscrewing it, the metal of the lock yielding under this forceful operation and folding backwardly upon itself in the flared inner end of the recess 2, as clearly illustrated in Fig. 2 of the drawings. As the point or engaging end of the lock 1 is turned one way or the other the yielding head 4 thereof will accommodate the slight longitudinal movement developed in such an action. When the lock is to be restored, it is merely necessary to turn the nut as if screwing it upon the bolt again, when the notches will engage and return the point of the lock to its normal position.

The nut-lock 1 need not be made of very great width, it being sufficient for all ordinary usage to make it about as wide in proportion to the size of the nut as shown in Fig. 3 of the drawings in dotted lines. Of course it should always be wide enough to engage at least one of the threads of the bolt no matter what the position of the nut thereon. It can, however, be made wide enough to engage several threads of the bolt at a time, and for this reason it is wise to arrange the notches in the edges of the threads in straight lines parallel with the axis of the bolt, as illustrated in Fig. 3.

It will be noticed that the lock requires no fastening means to retain it in place other than the shape or contour of the recess 2. The pawls or locks 1 can be readily stamped up from a single piece of metal and be easily inserted edgewise in the recess 2 in the nut.

It will be apparent that the device above described is not only simple in structure, but easy of manipulation, and that the said lock will be amply sufficient to lock the nut in position on the threads of the bolt under all ordinary conditions. It will also be evident that the locking power of the pawl can be overcome by the application of a little force when it is necessary or desirable to remove the nut from the bolt. The lock can also be readily applied to all nuts and bolts of ordinary patterns.

We are aware that hitherto it has been proposed to fasten or lock a nut to a bolt through the medium of metallic strips or pawls sunk and secured in recesses formed in the surface or body of the nut, the said strip extending toward the bolt, one end thereof being adapted to engage notches formed on the periphery of the threaded portion of the bolt. This we do not claim broadly; but we are not aware of the fact that prior to this application it has been suggested to make the recess in the nut of certain peculiar shape and form one end of the metallic strip with a head corresponding to the shape of the recess, the construction and relation being such that when the strip or pawl is inserted in said recess its head will be secured against accidental displacement, and at the same time longitudinal movement of the strip in the recess will be permitted.

Having now described our invention, what we claim as new, and desire to secure by Letters Patent, is—

1. A nut-lock, comprising a pawl having a yielding head formed by bending the metal of the pawl in substantially U shape, and then bending the same at right angles to the tongue of the pawl, the said pawl being seated in a recess corresponding in shape thereto formed in a nut so as to project inwardly therefrom and engage the threads of a bolt, the said threads being provided with notches, the said pawl engaging the notches and locking the nut when it is screwed into place but being capable of yielding without breaking when the nut is forcefully turned for unscrewing it, substantially as described.

2. A nut-lock, comprising a pawl made of flat metal and having a doubled portion at one end for forming a yielding head, the said pawl and head engaging a recess formed of corresponding shape in the nut to be locked, the said recess also having a flaring portion at its inner end to accommodate the point of the lock when folded one way or the other, the structure being such that the lock may engage notches on the threads of a bolt for locking the nut in place but the said nut can be removed by force, the yielding head of the lock permitting of necessary longitudinal movement thereof in its socket, and the flaring inner end of the socket or recess permitting of the doubling back of the pawl, substantially as described.

3. A nut-locking mechanism, comprising a nut having a recess formed therein with an enlarged end and a flaring end, a pawl having a yielding head and adapted to fit into said recess, the construction being such that longitudinal movement of the pawl in the recess, away from the periphery of the bolt, is permitted, the said head occupying the enlarged portion of the recess, and a bolt provided with a series of notches on the periphery of its threads, the structure being such that the pawl will lock the nut in position but will yield under force for removing the same, the flaring end of the recess in the nut accommodating the folding back of the pawl due to such an operation, substantially as described.

In testimony whereof we hereunto affix our signatures in presence of two witnesses.

RICHARD MINGES.
JOHN EWELL, Jr.

Witnesses:
GEORGE T. CLASON,
H. M. STODDARD.